United States Patent [19]
Dedert et al.

[11] Patent Number: 6,142,018
[45] Date of Patent: Nov. 7, 2000

[54] CONDUCTOR BURNISHING

[75] Inventors: Ronald J. Dedert, Geneva; Ronald D. Brewster, Keystone, both of Ind.; LaVern J. Grube, Fort Recovery, Ohio; Sherlie M. Walters, Decatur, Ind.

[73] Assignee: CTS Corporation, Elkhart, Ind.

[21] Appl. No.: 08/967,139

[22] Filed: Nov. 10, 1997

[51] Int. Cl.⁷ .............................. G01F 23/60; H01C 17/00
[52] U.S. Cl. .................................. 73/305; 73/313; 73/317; 29/620; 338/160; 428/208
[58] Field of Search ............................ 73/313, 317, 305; 338/160; 428/208; 29/620

[56] References Cited

U.S. PATENT DOCUMENTS

| | | |
|---|---|---|
| 2,799,756 | 7/1957 | Graham . |
| 3,457,637 | 7/1969 | Halpern ..................................... 29/620 |
| 4,278,725 | 7/1981 | Riley et al. .............................. 428/208 |
| 4,827,769 | 5/1989 | Riley ......................................... 73/313 |
| 5,169,465 | 12/1992 | Riley . |
| 5,341,679 | 8/1994 | Walkowsi et al. . |
| 5,554,965 | 9/1996 | Sundberg ................................ 338/160 |

*Primary Examiner*—Hezron Williams
*Assistant Examiner*—Michael Cygan
*Attorney, Agent, or Firm*—Albert W. Watkins; Mark P. Bougeois

[57] ABSTRACT

A variable resistor useful for automotive type fuel senders has a cermet film fired upon a refractory substrate. The cermet film is burnished to reduce asperity of the fired film. The resulting resistor element works with existing mechanical float type senders to provide a reliable and long lasting sender.

16 Claims, 1 Drawing Sheet

CONDUCTOR BURNISHING

BACKGROUND OF THE INVENTION

1. Field of the Invention

This invention pertains generally to measuring and testing, and more particularly to measuring liquid levels using a float and sensor. The measuring apparatus is preferably used to detect fuel levels within a receptacle such as a fuel tank.

2. Description of the Related Art

Fuel level sensors typically found in automobiles provide many challenges to a designer trying to achieve enduring performance. Among the challenges are factors specific to the automotive environment, such as high vibration, frequent cycling including simple sloshing of fuel within a tank, and widely varying operating temperatures. Other challenging factors are specific to the automotive fuel system, primarily derived from the sender being exposed to a wide variety of fuels and additives. For example, both gasoline and alcohol are generally effective at dissolving grease compounds and lubricants, thereby preventing a designer from incorporating lubricants into the sender. Both gasoline and alcohol will also cause swelling in many plastic materials. Detergents are also generally a part of automotive fuels, once again preventing any incorporation of grease or lubricant. Off-the-shelf gasoline additives often include very powerful cleaners and solvating agents for purposes such as fuel varnish removal. These cleaners and solvating agents will also attack various plastics and remove grease and lubricants. Finally, challenges exist for the designer which are common to resistive type sensors in general, such as variations in contact resistance, wear, and corrosion. Each of these challenges tend to reduce the effective life of the sender and limit options available to a designer.

In recognition of the unusually harsh automotive fuel environment, the use of lubricants which is traditional in other resistive or contacting sensor environments is impractical. Furthermore, polymer-bound resistive compositions are susceptible to fuel components and fuel additives, and have therefore also proved to be unacceptable. As a result, cermet materials which are formed from glasses, ceramics, conductive metals and screening agents are the materials of choice for fuel senders. Cermet resistors are typically formed from either ruthenium dioxide or silver-palladium compositions that are mixed or compounded with specialty glasses. Often, the cermet conductors are formed from silver or silver-palladium conductors, also mixed or compounded with specialty glasses. The specialty glasses will frequently include significant amounts of aluminum oxide and silica, both which are known to form hard and potentially very abrasive glass compositions. The compositions are typically screen printed onto a refractory substrate such as aluminum oxide, and then fired at very elevated temperatures, often in the range of six hundred to one thousand degrees Centigrade. At the elevated temperatures, the specialty glasses will begin to reflow and sinter, as will the precious metal particles. The screening agents pyrolitically decompose, leaving little or no residue. Eventually a conductive network is formed within the cermet material, and, most preferably, the glass forms an adhesive bond with both the substrate and the metal particles. Important to note, however, is the fact that neither the glass or the metal will actually be fully molten. Rather, the sintering process involves a surface energy phenomenon wherein smaller particles tend to unite to form larger, usually very non-spherical masses. These cermet materials offer much advantage in stability and chemical resistance, being very nearly inert with regard to the fuel components. Furthermore, the cermet materials are very hard, thereby reducing wear of the resistor material during the large number of cycles required in an automotive fuel sender. To address contact resistance issues, the resistor element is frequently patterned with or segmented by conductor stripes or dots. The contactor, instead of sliding over and contacting relatively high resistance materials, is able to contact low resistance materials which thereby tend to lower contact resistance and contact resistance variations. Furthermore, by using the low resistance material for a contact surface, wear does not change the sensed output measurably.

Unfortunately, in spite of the many advantages inherent in cermet compositions and conductor stripes, automotive fuel senders continue to be plagued by early failures. Conductive traces are worn from the alumina substrates, resulting in poor or completely failed electrical contact and elevated resistance readings. Events of poor or lost electrical connection may be sensed by the engine computer signalling a service engine light, or may trigger inaccurate or erratic fuel level measurements.

As a result of the continuing difficulties, a number of efforts have been made to improve fuel level sensors and thereby extend operational life. One such example is illustrated in U.S. Pat. No. 5,169,465 to Riley, incorporated herein by reference. Therein, a process is disclosed for forming a relatively smooth layer of glass between stripes of conductive material. Riley achieves this by sinking a cermet conductive material into a glass dielectric layer during sintering. While this process was initially believed to offer a solution to extended life, the full benefit originally conceived was, in practice, never actually achieved.

Another example of efforts at improving sender life is illustrated in U.S. Pat. No. 5,341,679 to Walkowski et al, also incorporated herein by reference. In the Walkowski reference, auxiliary components known to affect the vital contactor-resistor interface are improved, to gain tighter control over and ultimately achieve ideal parameters. Once again, however, these attempts may have proved beneficial but senders continue to demonstrate reliability problems.

These prior art senders are illustrated in FIGS. 1 and 2 by exaggerated cross-section, wherein a sender 100 includes a resistor substrate 110 having patterned thereon thick film cermet conductors 120, 122, 124 which include microscopically rough surfaces 130, 132, 134. Surfaces 130, 132 and 134 may be formed form the same cermet material as base conductors 120, 122, 124, or, as is known in the prior art, these surfaces 130, 132, 134 may be a different composition. Sliding over surfaces 130, 132, 134 and dropping partially towards substrate 110 at gaps 112 and 114 is contactor 140. While contactor 140 is illustrated as a rake in FIG. 1, it will be apparent to those of ordinary skill that there are a wide variety of contactor geometries available in the art and the rake geometry illustrated in FIG. 1 is purely for exemplary purposes. As aforementioned in the Riley patent, the phenomenon which was believed to damage the variable resistor was the undulating, up and down motion shown by line 150 which represents the vertical travel of contactor 140 as contactor 140 is passed horizontally over a length of substrate 110. In the Riley patent the undulation of line 150 was reduced by forming a continuous glass layer and sinking conductives 120, 122 124 into the glass layer. Unfortunately, and as aforementioned, this did not provide the desired solution. By further magnifying a single trace in prior art FIG. 2, the surface valleys such as valley 131 and surface peaks such as 133 are more apparent. The difference between the peaks and valleys may be represented by the dimension $R_a$, representative of surface finish, illustrated in FIG. 2. It has been determined by the present inventors, as will more fully be described hereinbelow, that the failure mechanism is not the undulation of contactor 140 illustrated by line 150, but instead is a result of the microscopic surface roughness represented by $R_a$.

SUMMARY OF THE INVENTION

In a first manifestation, the invention is a fuel level sender comprising, in combination, a liquid level float, a resistive element having a refractory substrate and cermet conductive material, and a contactor, wherein the improvement comprises a burnished surface on the cermet conductive which is in operative engagement with the contactor.

In a second manifestation, the invention is a resistor element offering extended life and improved electrical output, comprising a substrate; a resistor supported upon the substrate having sintered conductive particles and glass, a conductor electrically connected to the resistor, the conductor having sintered conductive particles and glass and further having an exposed, burnished surface; and an electrical contactor which passes over the conductor on the mechanically smoothed surface to provide electrical output.

In a third manifestation of the invention a method of manufacturing a resistor element comprises the steps of: applying a cermet paste having conductive particles, glass and an organic carrier to a refractory substrate; firing the paste to pyrolytically decompose organic carrier and further sinter conductive particles and glass to produce a fired cermet paste; and burnishing the fired cermet paste to reduce surface asperity.

Each of the manifestations exhibit improved solderability and extended operational life, providing substantial benefit over the prior art.

OBJECTS OF THE INVENTION

A first object of the invention is to provide a durable, robust sensor element. A further object of the invention is to provide a robust element which will work with existing mechanical float designs. Another object of the invention is to provide a sensor element which has substantial fuel and chemical resistance and which exhibits little or no change with changes in temperature or operating environment. These and other objects of the invention are achieved in the preferred embodiment, which will be best understood when considered in conjunction with the appended drawing figures.

DESCRIPTION OF THE PREFERRED EMBODIMENT

Figure 1:
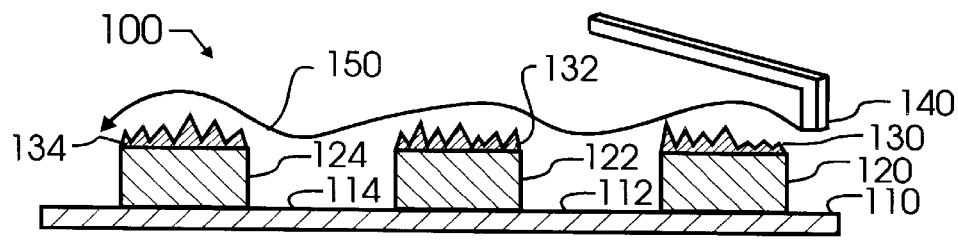
FIG. 1 illustrates a prior art fuel sender.
Figure 2:
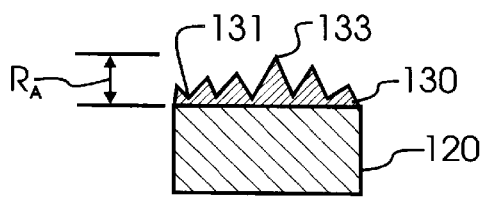
FIG. 2 illustrates a greatly magnified conductor typical of the sender of FIG. 1.
Figure 3:
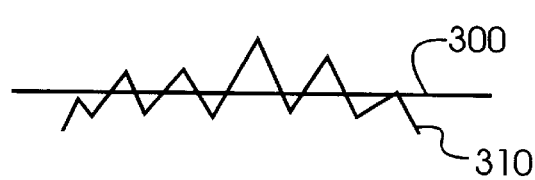
FIG. 3 illustrates the surface topography of the prior art conductor in comparison to an average thickness.
Figure 4:
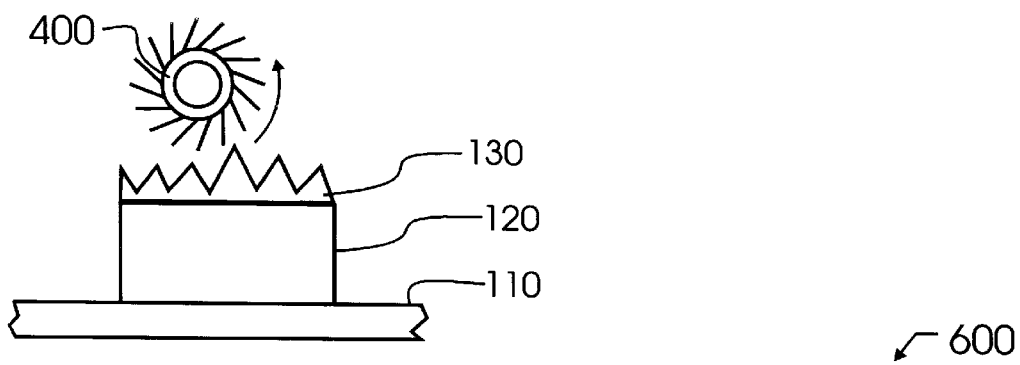
FIG. 4 illustrates the burnishing process of the present invention, which yields an element illustrated by greatly magnified view in FIG. 5.
Figure 5:
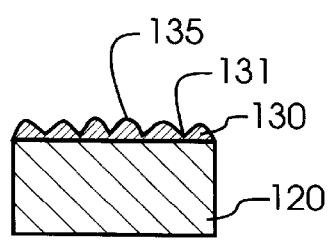

The prior art surface topography is illustrated at 310 in FIG. 3. A number of peaks and valleys are found therein, some which are typically quite sharp or jagged. In contrast a smooth line 300 is illustrated which represents the average height of surface 310, and which would represent an exceptionally smooth surface. While in the prior art an average surface height 300 was specified, this in no way took into account the potentially widely varying heights or asperities in the surface. Asperities, the present inventors discovered, such as the differences between peaks represented by 133 in FIG. 2 and valleys represented by 131 in the same figure, designated by $R_a$, and the relative sharpness of peaks 133, were discovered to rapidly erode contactor 140 to leave a sharp edge thereon. Once this degradation occurs, contactor 140 may actually act like a knife or wedge, cutting into and removing conductors such as conductor 120 from substrate 110.

In the typical cermet process, glass binder is not melted but is instead sintered. Even if the glass were melted, an unreasonable time above the melting point would be required to smooth the surface thereof, due to the inherent high viscosity of molten glass. Furthermore, such an extended time which would be required for melting can, as in the case of Riley, result in a complete loss of exposed conductive particles. So, while the aforementioned prior art solutions improved secondary factors such as contactor undulation on a macroscopic scale as shown by line 150, the primary issue of surface roughness was not adequately addressed. Furthermore, other techniques such as firing multiple layers fail to fully address the issue, once again due to the elevated viscosity of a cermet composition during firing.

In the present invention, a more direct approach is used to remove surface asperity, by directly burnishing surface 130. For the purposes of this disclosure, burnishing is defined as, "making smooth or glossy by or as if by rubbing; polish." In one embodiment, burnishing may be achieved by rubbing with a tool that serves especially to smooth or polish. In the preferred embodiment, a maroon colored general purpose abrasive pad available from 3M is wrapped on a drum 400. While the exact composition and construction of the abrasive pad of the preferred embodiment is not known to the inventors, the pad is a generally fibrous, open mat, unwoven polymer construction having abrasive content therein. Drum 400 is rotated and brought down into contact with surface 130. While drum 400 is illustrated for exemplary purposes, one of ordinary skill in the art will recognize that there are a multitude of methods available for burnishing and a multitude of tools suited for each of the methods.

As a result of burnishing, sharp peaks 133 tend to be fragmented or abraded, eventually abrading down to ridges 135. This presents a far less abrasive surface during engagement with contactor 140. Even though conductor 120 may be thinned by the burnishing process, the surface finish $R_a$ is improved and the number of surface defects are also substantially reduced. Most surprisingly, even though conductor 120 is thinner and effectively pre-worn after burnishing, the life of the sender was increased by a factor of seven in one study. Contactor wear in the preferred embodiment is substantially diminished.

Figure 6:
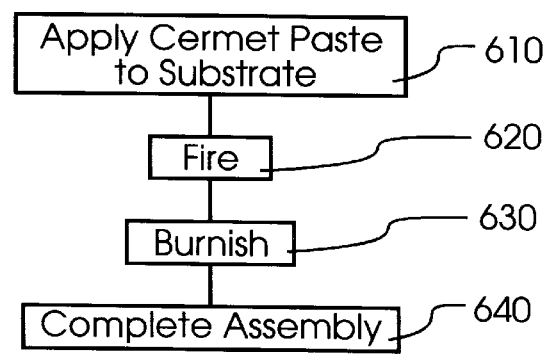
FIG. 6 diagrams the basic manufacturing flow required to produce an element in accord with the present invention.

The method used to realize the benefit of the present invention is shown in FIG. 6, wherein a cermet paste is applied in step 610 to a refractory substrate. The cermet paste is fired at step 620, and then burnished at step 630. Integrated directly with step 630, or provided separately, depending upon the specific method of burnishing chosen for step 630, there will preferably be cleaning to remove debris. In the preferred embodiment, cleaning is accomplished with a stream of compressed air. The sender is then assembled in step 640, ready to be placed into service. As is apparent, no unusual or extraordinary steps are required other than the burnishing step 630. In addition, burnishing has been determined to benefit solderability of the conductors, providing further synergistic advantage over the prior art. Easier solder wetting improves initial manufacturing yields during the soldering step, thereby reducing solder rework and reducing assembly cost.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. A fuel level sender comprising, in combination, a liquid level float, a resistive element having a refractory substrate and cermet conductive material having glass and metal particles sintered upon said refractory substrate, and a contactor resiliently pressed against said cermet conductive material for sliding upon and establishing electrical contact with said cermet conductive material, said contactor prone to abrading when in contact with said cermet conductive material during said sliding and consequently forming a knife edge, wherein the improvement comprises a burnished surface formed on said cermet conductive material prior to operative engagement with said contactor thereby reducing or delaying said abrading of said contactor during said sliding, whereby operating life and manufacturing solderability of said fuel level sender are both improved.

2. The fuel level sender of claim 1, wherein said resistive element further comprises a cermet resistor composition electrically connected to said cermet conductive material.

3. The fuel level sender of claim 1, wherein said burnished surface exhibits a smaller surface roughness $R_a$ than an unburnished surface.

4. The fuel level sender of claim 1, wherein said burnished surface is produced by an abrasive-filled polymer pad.

5. A resistor element offering extended life and improved electrical output, comprising:
   a) a substrate;
   b) a resistor supported upon said substrate having sintered conductive particles and glass;
   c) a conductor electrically connected to said resistor, said conductor having sintered conductive particles and glass and further having an exposed, burnished surface; and
   d) an electrical contactor for making sliding contact with said conductor and forming an electrical connection therewith which is of a hardness and abrasion characteristic relative to said sintered conductive particles and glass to be readily eroded by sliding contact therewith, absent said burnished surface, to form a knife edge and consequently to destructively scrape said conductive particles and glass from said substrate, which passes over said conductor on said burnished surface to provide said electrical output, whereby erosion of said electrical contactor is substantially diminished during operation of said resistor element.

6. The resistor element of claim 5 wherein said burnished surface is a mechanically smoothed surface.

7. The resistor element of claim 6, wherein said burnished surface is an abrasive pad smoothed surface.

8. The resistor element of claim 7, wherein said abrasive pad is an open mat fibrous polymer pad.

9. The resistor element of claim 8, wherein said abrasive pad further comprises abrasive filler.

10. The resistor element of claim 7, wherein said burnished surface is additionally free of burnishing debris.

11. A method of manufacturing a resistor element having two terminations and a sliding contactor for electrically tapping said resistor element between said two terminations, comprising the steps of:
   a) applying a cermet paste having conductive particles, glass and an organic carrier to a refractory substrate;
   b) firing said paste to pyrolytically decompose said organic carrier and further sinter said conductive particles and said glass to produce a fired cermet paste which is sufficiently hard and abrasive relative to said sliding contactor to form a knife edge on said contactor during operational mechanical motion between said contactor and said fired cermet paste; and
   c) burnishing said fired cermet paste to reduce surface asperity; and
   d) assembling said contactor to contact said burnished fired cermet paste;

whereby said cermet resistor element exhibits improved solderability and extended operational life.

12. The manufacturing method of claim 11, comprising the additional steps of:

coating a cermet resistive paste onto said substrate, said cermet resistive paste having conductive particles, glass and an organic carrier; and heating said resistive paste to pyrolytically decompose said organic carrier and further sinter said conductive particles and said glass.

13. The manufacturing method of claim 11, wherein the step of burnishing is comprised by rubbing said fired cermet paste with a pad.

14. The manufacturing method of claim 13, wherein said pad is an abrasive filled polymer pad.

15. The manufacturing method of claim 11, comprising the additional step of cleaning said fired cermet paste after said burnishing step.

16. The manufacturing method of claim 15, wherein said cleaning is achieved by spraying said fired cermet paste with a stream of compressed air.

* * * * *